United States Patent
Miteva et al.

(10) Patent No.: US 8,767,293 B2
(45) Date of Patent: Jul. 1, 2014

(54) MICROSCOPE MEASUREMENT SYSTEM

(75) Inventors: Tzenka Miteva, Stuttgart (DE); Piotr Minkin, Stuttgart (DE); Gabriele Nelles, Stuttgart (DE); Akio Yasuda, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 1023 days.

(21) Appl. No.: 12/599,764

(22) PCT Filed: May 15, 2007
(Under 37 CFR 1.47)

(86) PCT No.: PCT/EP2007/004318
§ 371 (c)(1),
(2), (4) Date: Oct. 18, 2010

(87) PCT Pub. No.: WO2008/138381
PCT Pub. Date: Nov. 20, 2008

(65) Prior Publication Data
US 2011/0051235 A1    Mar. 3, 2011

(51) Int. Cl.
*G02B 21/34* (2006.01)
(52) U.S. Cl.
USPC ............................. 359/398; 359/381; 356/244
(58) Field of Classification Search
CPC .......... G02B 7/02; G02B 7/021; G02B 7/023; G02B 7/026; G02B 7/14; G02B 7/16; G02B 21/00; G02B 21/0016; G02B 21/02; G02B 21/24; G02B 21/248
USPC ......... 359/362, 368, 381, 391–398, 656, 661, 359/811, 819; 356/244; 435/303.1, 809; 600/119, 121–125, 133, 134
See application file for complete search history.

(56) References Cited

U.S. PATENT DOCUMENTS

| 4,589,742 | A  |   | 5/1986  | Schindl |
| 4,819,658 | A  |   | 4/1989  | Kolodner |
| 6,310,342 | B1 | * | 10/2001 | Braunstein et al. ............... 850/2 |
| 6,327,102 | B1 |   | 12/2001 | Naulleau et al. |
| 7,327,514 | B2 | * | 2/2008  | Uhl et al. ...................... 359/381 |

(Continued)

FOREIGN PATENT DOCUMENTS

| CN | 1715988 A   | 1/2006 |
| JP | 60-250640 A | 12/1985 |

(Continued)

OTHER PUBLICATIONS

Chinese Office Action issued Apr. 8, 2011, in Patent Application No. 200780052986.5 (with English-language translation).

(Continued)

*Primary Examiner* — Stephone B Allen
*Assistant Examiner* — James McGee
(74) *Attorney, Agent, or Firm* — Oblon, Spivak, McClelland, Maier & Neustadt, L.L.P.

(57) ABSTRACT

A microscope measurement system including: an optical microscope including a microscope body and an objective connected to the microscope body; a chamber including a support mechanism holding an object to be examined therein, the chamber including an opening inserting the objective into the chamber such that the objective is located essentially within the chamber and the microscope body is located essentially outside of the chamber; a sealing mechanism that provides an essentially gas-tight connection between the optical microscope and the chamber such that the chamber is sealed.

24 Claims, 12 Drawing Sheets

(56) References Cited

U.S. PATENT DOCUMENTS

| | | | |
|---|---|---|---|
| 7,910,355 B2* | 3/2011 | Tsuchiya et al. | 435/288.7 |
| 2005/0184028 A1* | 8/2005 | Baur et al. | 216/92 |
| 2006/0018013 A1* | 1/2006 | Suzuki et al. | 359/368 |

FOREIGN PATENT DOCUMENTS

| | | |
|---|---|---|
| JP | 2-130456 A | 5/1990 |
| JP | 6-201999 A | 7/1994 |
| JP | 2004-77481 A | 3/2004 |
| WO | 2006 005810 | 1/2006 |
| WO | 2007 065711 | 6/2007 |

OTHER PUBLICATIONS

Japanese Office Action issued Jan. 22, 2013 in Patent Application No. 2009-541845 with English Translation (summary).

A. V. Kachynski et al. "Three-Dimensional Confocal Thermal Imaging Using Anti-Stokes Luminescence", Applied Physics Letters, vol. 87, No. 2, Jul. 6, 2005, pp. 023901-1-023901-3.

* cited by examiner

Triplet-Triplet Annihilation: $T_1 + T_1 \rightarrow S_0 + S_1^* (S_n)$

MICROSCOPE MEASUREMENT SYSTEM

The invention relates to a microscope measurement system, to a chamber for holding an object to be examined by an optical microscope, to sealing means for providing a gas-tight connection between an optical microscope and the chamber, and to an optical microscope.

A microscope measurement system according to the present invention is used for high resolution measurement of temperatures and optical images using luminescence and 3D luminescence microscopy. For example, temperatures and/or temperature distributions can be measured at a resolution <1 µm.

The precision measurement and recording of high speed thermal transients on microscopic targets is critical, for example in the examination of biological objects or in the manufacturing of semiconductors and other electronic devices. The measurement of temperatures and/or temperature distributions in operating electronic devices is important in the thermal management of integrated circuits. More significantly even, such measurement should give information with respect to the understanding of the device physics which would then facilitate optimization processes. In the past there have been works on modeling as well as experimental registration of spatial and temporal temperature distributions in operating devices, with the two optical registration approaches reported so far being infrared thermal microscopy and photo emission microscopy in combination with Raman microscopy (G. Albright, J. Stump, C. Li, Quantum Focus Ins. Corp. and H. Kaplan, Honeyhill Technical Company, Highlights, 2006; T. Fuyuki, K. Kitajima, H. Yano, T. Hatayama, Y. Uraoka, S. Hashimoto, Y. Morita, Thin Solid Films 487, 216-220, 2005; Y. Uraoka, K. Kitajima, H. Kirimura, H. Yano, T. Hatayama, T. Fuyuki, Japanese Journal of Applied Physics 44, 2895-2901, 2005; S. Inoue, M. Kimura, T. Shimoda, Japanese Journal of Applied Physics 42, 1168-1172, 2003; A. Sarua, H. Li, M. Kuball, M. J. Uren, T. Martin, K. P. Hilton, R. S. Balmer, C S Mantech, Apr. 24-27, 2006, Vancouver, British Columbia, Canada; J. W. Pomeroy, M. Kubal, M. J. Uren, K. P. Hilton, R. S. Balmer, T. Martin, Applied Physics Letters 88, 023507, 2006).

In the prior art, it is known to mount an object to be examined on a microscopic stage, such as a micromechanical positioning stage or a scanning piezo stage, for moving an object supported on the stage in the x-, y- and z-directions. Further, it is known to use micro-positioners for carrying contacting needles, tweezers, pipettes and the like for manipulating the object to be examined. Such micro-positioners usually are fixed to a separate support plate which is located around the periphery of the microscopic stage. Due to the mechanical arrangement, shape and size of the micro-positioners, it is usually necessary that the objective of the microscope is positioned at a considerable distance to the object to be examined, thus resulting in low numerical aperture, such as 0.3 NA.

Further, it is known to examine and characterize samples in air or in vacuum, as described in the Data Sheets of the "M150 Measurement Platform" of Cascade Microtech, Beaverton, Oreg., USA; of the "S-1160 Probe Station" of Advanced Microprobing Solutions, Gilroy, Calif., USA; of the "VACP2200/VACM200 Vacuum Station" of Micromanipulator Company, Carson City, Nev., USA; and of the "VFTTP4 Probe Station" of LakeShore Cryotronics, Inc., Westerville, Ohio, USA. When measurement is performed in vacuum, it is necessary to provide a vacuum probe station enclosing the entire probe station in a vacuum chamber. The microscope will be mounted external thereto, so that there will be a considerable distance between the objective of the optical microscope and the object to be examined so that it is difficult to achieve high resolution measurement.

However, when performing measurements on sensitive oxidizable substances, such as biological samples or semiconductors having no passivation layer, or when investigating electronic devices, such as transistors but not limited thereto, during operation, it is important to do so in a controlled atmospheric environment. Therefore, need exists for a microscopic measurement system which achieves high physical spatial resolution in all three dimensions, i.e. in the x, y and z directions, in combination with fast detection and high temperature and/or light resolution, the measurement being formed on objects which need to be kept in a controlled atmosphere.

This object is solved by a microscope measurement system as set forth herein, a chamber for holding an object to be examined as set forth herein, sealing means for providing a gas-tight connection between an optical microscope and a chamber as set forth herein, and an optical microscope as set forth herein.

The present invention provides a microscope measurement system including an optical microscope having a microscope body and objective means connected to said microscope body; a chamber including support means for holding a object to be examined therein, said chamber having an opening for inserting said objective means into said chamber in such a way that said objective means is located essentially within said chamber and said microscope body is located essentially outside of said chamber; and sealing means providing a tight connection between the optical microscope and the chamber in such a way that said chamber is sealed. The connection between the optical microscope and the chamber is such that the chamber either is hermetically sealed or that a limited amount of air flow is allowed. In the latter case, the chamber preferably is operated similar to a clean room by establishing a positive pressure in the chamber so that gas contained in the chamber can escape at a controlled rate but no gas or air can enter the chamber via the sealing. Additionally, it is also possible to operate the chamber at a slight vacuum such as at $10^{-2}$, $10^{-3}$, or $10^{-4}$ bar. Accordingly, the invention provides a microscope measurement system where the object to be examined can be located in a chamber in which a controlled atmosphere, e.g. an inert atmosphere or a slight vacuum, is maintained. The optical microscope can be partly inserted into said chamber so that the distance between the objective of the microscope and the object to be examined can be set to a minimum. This is made possible by a new sealing means which is provided to achieve an essentially gas-tight connection between the optical microscope and the chamber.

In the preferred embodiment of the invention, the objective means are adapted to rotate relative to the microscope body and the sealing means are adapted to allow rotation of said objective means relative to said microscope body. Additionally, the sealing means preferably are also adapted to allow movement of the objective means along its longitudinal axis as well as in a direction vertically thereto, i.e. in the x-, y- and z-directions.

In the preferred embodiment of the invention, the sealing means comprise a ring system including a chamber ring fixedly connected to and sealed with said opening of said chamber, an objective ring fixedly connected to and sealed with said objective means, and an adapter ring mounted to said objective ring in such a way to allow rotation of said objective ring relative to said adapter ring, and a flexible sleeve mounted to both said chamber ring and said adapter ring in such a way that there is a hermetic seal between said chamber ring and said adapter ring.

Preferably, the flexible sleeve is adapted to allow relative movement between said chamber ring and said adapter ring along a longitudinal axis of said objective means as well as vertically thereto, i.e. in the x-, y- and z-directions. Preferably, there is a seal ring provided between the objective ring and the adapter ring.

In the preferred embodiment, the sealing means further comprise an auxiliary ring for mounting said adapter ring to said objective ring, wherein said auxiliary ring comprises spring means for adjusting a contact pressure between the objective ring and the adapter ring thereby adjusting an internal gas pressure of the chamber.

In the preferred embodiment of the invention, the object to be examined is kept in an inert atmosphere. For this purpose, the chamber comprises a gas inlet for introducing an inert gas into the chamber, for example nitrogen ($N_2$) or noble gases, such as helium or argon. When using an inert atmosphere, it is possible to examine semiconductor devices having no passivation layer during operation or other sensible substances which are easily oxidized. Preferably, there is also an oxide sensor in the chamber or connected thereto in order to make sure that the atmosphere in the chamber is free of oxygen. Further, the gas in the chamber can be kept at a pressure which is slightly above atmospheric pressure (>1 bar) allowing a controlled gas flow to escape the chamber but preventing gas from entering the chamber via the sealing means.

In the preferred embodiment, the support means includes a light-weight aluminum table and a scanning piezo stage mounted thereon, the piezo stage adapted to move the object supported thereon in the x, y, and z directions. Additionally, it is possible to mount the chamber as a whole on a scanning x-y-table or x-y-z-table in order to perform coarse adjustment of the object to be examined in the x- and y-directions and possibly also in the z-direction. Further, there is an object holder and at least one nano-manipulator mounted on or at the side of the scanning piezo stage. Preferably, very small and light weight nano-manipulators are chosen, such as nano-manipulators of Kleindiek Nanotechnik GmbH, Reutlingen, Germany. It is preferred to use small and light-weight nano-manipulators to keep the load on the table as small as possible and to keep the space above and around the object to be examined as empty as possible.

According to the preferred embodiment, the objective means comprises a revolver body carrying one or more objectives. Further, the objective means is inserted into the chamber such that a distance between one of said objectives and the object to be examined can be less than 6 mm, preferably between 1 nm and 5 mm. The distance will depend on the type of microscope used, such as scanning near-field microscopes using an SNOM objective, classical microscope or confocal scanning microscope. If using a scanning near-field optical microscope, it is preferred to use a suitable fiber together with the objective in order to be able to approach the object to be examined. In this case the distances can be as small as 5 nm to 30 nm or even smaller. In the another embodiment of the invention, the optical microscope is a confocal luminescence microscope or a stimulated emission depleted, STED, microscope, where the distances between the objective and object to be examined would be in the order of a few Millimeter.

Near-field scanning optical microscopy allows to extend the measurements and standards infrastructure for the nanoscale optical characterization of thin films and interfaces. Near-field scanning optical microscopy (NSOM) is developed for quantitative evaluation of surfaces, with a particular emphasis on understanding organic multicomponent films. Current facilities include a metrological NSOM built on a linearized flexure stage, a wet-cell NSOM suitable for investigating biological or biomematic films, and a near-field probe preparation and evaluation facility.

Near-field scanning optical microscopy (NSOM) is a type of microscopy where a sub-wavelength light source is used as a scanning probe. The probe is scanned over a surface at a height above the surface of a few nanometers. In one embodiment, a small aperture on the end of a tapered and aluminum-coated optical fiber is used as a probe. By illuminating a sample with the "near-field" of a small light source, it is possible to construct optical images with resolution well beyond the usual "diffraction limit", and typically about 50 nm. It is possible to use NSOM to investigate polymer blends and composites, and it should be possible to use the same technology to enable quantitative evaluation of such films. Simultaneous fluorescence, transmission, and topography measurements can be used in conjunction with modeling to study the face separation of polymer blends. More information on NSOM can be found in publications of the NIST Physics Laboratory, Gaithersburg, Md., USA, and in related publications addressed therein.

The present invention also provides a chamber for holding an object to be examined by an optical microscope, the chamber including support means for holding the object to be examined therein and having an opening for inserting an objective of said microscope into said chamber in such a way that said objective is located essentially within said chamber at a predetermined distance to said object to be examined; and sealing means providing an essentially gas-tight connection between the optical microscope and the chamber in such a way that said chamber is sealed.

The invention further provides sealing means for providing an essentially gas-tight connection between an optical microscope and a chamber in which an object to be examined is located in such a way that said chamber is sealed, said sealing means comprising a ring system including a chamber ring connectable to said opening of said chamber, an objective ring connectable to an objective of said optical microscope, and an adapter ring mounted to said objective ring in such a way to allow rotation of said objective ring relative to said adapter ring, and a flexible sleeve mounted to both said chamber ring and said adapter ring in such a way that there is a seal between said chamber ring and said adapter ring.

According to a further aspect, the invention provides an optical microscope having a microscope body and objective means connected to said microscope body; wherein sealing means are mounted on the objective means for providing an essentially gas-tight connection between the optical microscope and an opening into which the objective means is to be inserted.

The invention preferably is used in combination with a confocal luminescence microscope in a method of measuring a temperature and/or temperature distribution as described in pending European patent application EP 06 026 681. The entire disclosure of this reference is incorporated herein by reference. According to this document, a temperature or temperature distribution is measured at a resolution <1 µm an object, such as an electronic device or a biological object, by performing the following steps: a) providing an object, b) applying a thermometer layer on said object or on a part of the surface of said object, where a temperature and/or temperature distribution is to be measured, said thermometer layer comprising a matrix and a molecular thermometer having temperature dependent emission characteristics, said molecular thermometer being embedded in said matrix, said thermometer layer having a thickness 40 nm, preferably in the range of from 10 nm to 40 nm, c) providing a microscope having a light source, a first detector, a second detector, and a microscopy stage for receiving and scanning a sample to be examined, d) placing said object on said microscopy stage and using said light source to photoexcite said molecular thermometer, e) measuring emission of radiation from said photoexcited molecular thermometer by measuring a luminescence intensity ratio using said first and said second detector, wherein said luminescent intensity ratio is the ratio of luminescent intensity at a first and second wavelength, wherein said first and said second detector are used to measure a luminescence intensity at said first and second wavelength, respectively, f) determining a temperature and/or temperature distribution based on said measured luminescence intensity ratio.

A "thermometer layer" as used herein is meant to refer to a layer which comprises a polymeric matrix and, embedded therein a molecular thermometer. A "molecular thermometer", as used herein is meant to refer to a molecular species or a combination of several molecular species together having temperature dependent emission characteristics. The term "molecular thermometer" is meant to encompass any elemental substance matter, chemical compound or mixture of chemical compounds and/or elemental substance matter whose fluorescence and/or phosphorescence emission intensity characteristics are temperature dependent. Preferably, a "molecular thermometer" has a lifetime (lifetimes) of its excited state (excited states) in the range of from ps to µs. Preferred embodiments of the molecular thermometer are dyes or combination of dyes selected from the group comprising metallo-porphyrins, also herein sometimes referred to as "metallated porphyrins", molecules having an inter-system crossing from a singlet to a triplet state occur upon photoexcitation for >1% of the excited singlet state(s), preferably >50%, more preferably >90%, and metal-organic molecules having Ir, Pt, Ru, or Pd or others like Zn, Fe, Au, Ag, etc. in their structure and having an inter-system crossing occur, upon photoexcitation for >1% of the excited singlet state(s), preferably >50%, and more preferably >90%. In general, as molecular thermometer any emissive dye with thermally activated band(s) or any combination of at least two emissive dyes can be used, whose intensity of luminescence varies with temperature.

Particularly preferred molecular thermometers are the metallated porphyrins (MOEP), wherein the metal is selected from Pt, Pd, Zn, Ir, and Ru, Fe, Mg, Co, Ni, etc. For these molecules the temperature dependent luminescence intensity ratio is the ratio of a fluorescence intensity from a singlet state of the porphyrin molecules, optionally including a delayed fluorescence that follows a triplet-triplet annihilation process, at said first wavelength, to a phosphorescence intensity from an excited triplet state of the porphyrin molecules at said second wavelength ($I_{singlet}/I_{triplet}$).

The matrix, in accordance with preferred embodiments, into which the molecular thermometer is embedded, is optically transparent and/or inert, preferably optically transparent and inert. The term "optically transparent", when used herein in connection with a matrix, is meant to signify that such matrix is transparent in the wavelength range of the emission of the molecular thermometer embedded in such matrix. Preferably, the term "optically transparent", as used herein is meant to refer to transparency in the range of from 500 nm to 1500 nm. The term "inert", when used herein in connection with a matrix, is meant to signify that such matrix is chemically inert, i.e. it does not undergo chemical reactions. Preferably, such term is meant to refer to the fact that the matrix does not undergo chemical reactions with the molecular thermometer embedded in such matrix. Hence, preferably, the term "inert" is used synonymously herein with "chemically inert with respect to the molecular thermometer".

A "molecule having an inter-system crossing occur upon photoexcitation" is meant to refer to a molecule wherein, intramolecular radiationless transitions between states of different multiplicity occur which transitions are named inter-system crossing (ISC), in our case specifically S-->Tn. In particular, upon photoexcitation, a transfer of excited electrons from a singlet state to a triplet state occurs. If in this context, reference is made to an amount in percentage at which such inter-system crossing occurs ("for >x % of the excited singlet state(s)"), this is meant to refer to the percentage of electrons in the singlet stage which undergo such inter-system crossing transfer. Hence, if the inter-system crossing (ISC) occurs at >1% of the excited singlet state(s), this means that >1% of all electrons in the excited singlet state(s) are crossing into the triplet state(s).

A "triplet-triplet annihilation process" as used herein, is meant to refer to a process in which two thermometer molecules both in a triplet state interact (usually upon collision) to produce one molecule in an excited singlet state and another molecule in its ground singlet state. This is often, but not always, followed by delayed fluorescence.

Hence, in preferred embodiments, the luminescence intensity ratio is the ratio of a fluorescence intensity of a singlet state of said molecular thermometer, which may be a mixture of delayed fluorescence and prompt fluorescence, at said first wavelength, to a phosphorescence intensity from an excited triplet state of said molecular thermometer a said second wavelength. The fluorescence intensity may be a mixture of delayed fluorescence and prompt fluorescence. Preferably, the delayed fluorescence is a delayed fluorescence that follows a triplet-triplet-annihilation process. The term "prompt fluorescence", as used herein is a fluorescence that is not delayed.

If an intersystem crossing occurs for >50% of the excited singlet state Sn to the triplet state Tn, this ensures a highly populated triplet level Tn, the emission from which is detected as phosphorescence. As described above, a triplet-triplet annihilation process is followed by an internal up-conversion which may give rise to delayed fluorescence. The delayed fluorescence is occurring at a first wavelength, and the phosphorescence is occurring at a second wavelength, and their respective intensities are detected by a first and second detector, respectively.

In principle, the respective processes can be described with reference to FIG. 1, which shows the energy scheme and the molecular structure of palladium octaethylporphyrin (PdOEP) as an example of a molecular thermometer. The principle is as follows: After absorption of a photon in the singlet band of the molecule, due to an effective inter-system crossing (ISC) (in this molecule >90%), strongly enhanced by spin-orbit coupling to the metal center of the molecule, the long-lived triplet state $T_1$ of the molecule is highly populated. This triplet state can be regarded as a reservoir of excited states for subsequent energy transfers. As a consequence of a triplet-triplet annihilation (TTA) process between the excited thermometer molecules themselves, one of the thermometer molecules returns to the ground state and the other is excited into a higher singlet state. The emissive relaxation to the ground state from the triplet state is the phosphorescence, whereas the emissive relaxation from the higher singlet state can be detected as delayed fluorescence.

The present inventors have surprisingly found that it is possible to apply a thermometer layer to an object and to study such object using high resolution microscopy techniques and thereby be able to measure the temperature and/or temperature distribution in or on this object with unprecedented high precision, high temporal and high spatial resolution. As opposed to previous methods, no separate molecular heater layer is required, and the method does not rely on Raman microscopy or infrared thermal microscopy. Preferred methods of microscopy to be used in conjunction with the present invention are confocal microscopy and stimulated emission depletion microscopy (STED).

In a typical STED microscope the excitation beam is overlapped with a doughnut-shaped beam that is capable of de-exciting fluorophores by stimulated emission. Co-alignment of the beam ensures that fluorescence is allowed only in the central area of the excitation spot where the doughnut beam is close to zero. Scanning with a narrowed spot across the sample readily yields subdiffraction images. With a sufficiently intense doughnut, the fluorescent spot of a STED microscope can, in principle, be sharpened down to the molecular scale (see for example Wilig et al., 2006, Nature Vol. 440, p. 935-939).

The principle of confocal microscopy can be explained by comparing it with conventional epifluorescence microscopy. In a conventional epifluorescence microscope, the shorter wavelength excitation light is reflected by a chromatic reflector through the objective and bathes the whole of the specimen in fairly uniform illumination. The chromatic reflector has the property of reflecting short wavelength light and transmitting longer wavelength light. Emitted fluorescent light (e.g. longer wavelength than the excitation light) passes from the specimen and passes straight through the chromatic reflector to the eyepiece.

In a confocal imaging system a single point of excitation light (or sometimes a group of points or a slit) is scanned across the specimen. The point is a diffraction limited spot on the specimen and is produced either by imaging an illuminated aperture situated in a conjugate focal plane to the specimen or, more usually, by focusing a parallel laser beam. With only a single point illuminated, the illumination intensity rapidly falls off above and below the plane of focus as the beam converges and diverges, thus reducing excitation of luminescence for interfering objects situated out of the focal plane being examined. Luminescence light (i.e. signal) passes back through the dichroic reflector (mirror) and then passes through a pinhole aperture situated in a conjugate focal plane to the specimen. Any light emanating from regions away from the vicinity of the illuminated point will be blocked by the aperture, thus providing yet further attenuation of out-of focus interference. The light passing through the image pinhole is detected by a photodetector. Usually a computer is used to control the sequential scanning of the sample and to assemble the image for display onto a video monitor. Most confocal microscopes are implemented as imaging systems that couple to a conventional microscope.

In summary, a confocal imaging system achieves out-of-focus rejection by two strategies: a) by illuminating a single point of the specimen at any one time with a focussed beam, so that illumination intensity drops off rapidly above and below the plane of focus and b) by the use of blocking a pinhole aperture in a conjugate focal plane to the specimen so that light emitted away from the point in the specimen being illuminated is blocked from reaching the detector. Confocal imaging can offer another advantage in favorable situations (small pinhole size, bright specimen): the resolution that is obtained can be better by a factor of up to 1.4 than the resolution obtained with the microscope operated conventionally.

A confocal microscope can be used in reflection mode and still exhibit the same out-of-focus rejection performance.

In preferred embodiments, a laser is used as illumination source. Moreover, preferably optical sections of a sample may be obtained by scanning using a sample scanning stage. More preferably, such sample scanning stage is a piezo-driven stage. The stage is moved in a scanning pattern in the x-y-direction (x-y scanning) at micrometric distances. Furthermore, the addition of a z-motorization of the microscope stage allows to perform z-scanning and thus to obtain a series of optical sections of the sample. Moreover, preferably avalanche photodiodes are used as detectors. In order to ensure that each detector is specific for a specific wavelength, each detector has an interference filter for this specific wavelength to be detected by this particular detector. Alternatively, photomultipliers can be used instead of avalanche photodiodes as well.

In preferred embodiments, the method comprises an additional calibration step wherein external means for measuring temperatures are used. Such external means for measuring temperatures are for example a thermocouple PT-100 (as described in NTB Sensordatenbank/Labor Elektronische Messsysteme; Sensor No. 03, Seiten 1-3; Baumgartner; commercially available e.g. from Endress+Hauser, Switzerland) fixed on top of the object covered with the thermometer layer. The object is then macroscopically heated. In one embodiment, during the calibration step, the respective luminescence intensity ratio is correlated with its corresponding temperature at which it has been measured. Such correlation may be represented as a plot of measured luminescence intensity ratio from the photoexcited molecular thermometer verses the measured temperature. It is clear for someone skilled in the art that from this operation a plot results which may be referred to as a "calibration curve". Likewise, the same information may be represented by an appropriate mathematical equation, for example in some cases by a linear equation of the form $y=mx+b$. In any case, it is clear to someone skilled in the art that the information obtained from such correlation allows the experimental to interpolate or extrapolate and to determine the temperature from any measured luminescence intensity ratio from the photoexcited molecular thermometer. Likewise, it is clear to someone skilled in the art that the data obtained may not necessarily have a linear relation ship, but for reasons of simplicity, this example has been given to illustrate the purpose of such correlation step.

By using a thermometer layer, in the absence of a specific heater layer, in combination with such high resolution microscopy techniques it is possible to obtain a spatial resolution in the x, y-plane which is only diffraction limited and may be as low as <200 nm, depending on the numerical aperture and the excitation light source wavelength. Furthermore, the resolution obtained in the z-direction purely depends on the thermometer layer thickness and is in the range of from 10 nm to 40 nm. Moreover, the sensitivity achieved is 0.25 K or better, and the response times achieved are as short as 100 ns. Since the thermometer layer may be embedded in a multilayer structure, and since there may even be more than one thermometer layer placed at various depths within the object to be measured, also a three dimensional image and measurement of the temperature/temperature distribution can be obtained.

The method is independent from source intensity variation because luminescence intensity ratios are measured which makes the temperature measurement method.

In the following, reference is made to the figures, wherein

FIG. 2 shows a schematic diagram of an embodiment of a confocal microscope setup which can be used in the microscope measurement system according to the invention, wherein the sample 10 is an object whose temperature or temperature distribution should be measured and upon which a thermometer layer has been applied.

Figure 1:
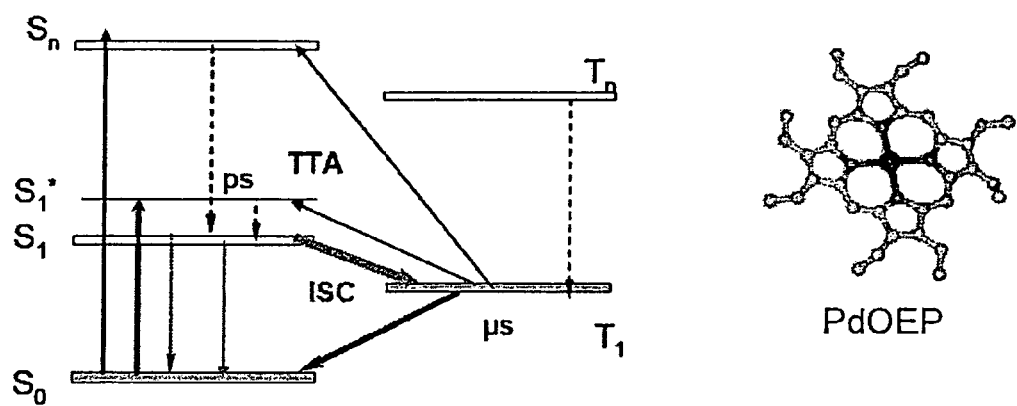
FIG. 1 shows the energy scheme and the molecular structure of palladium octaethylporphyrin (PdOEP) as an example of an active thermometer molecule.
Figure 2:
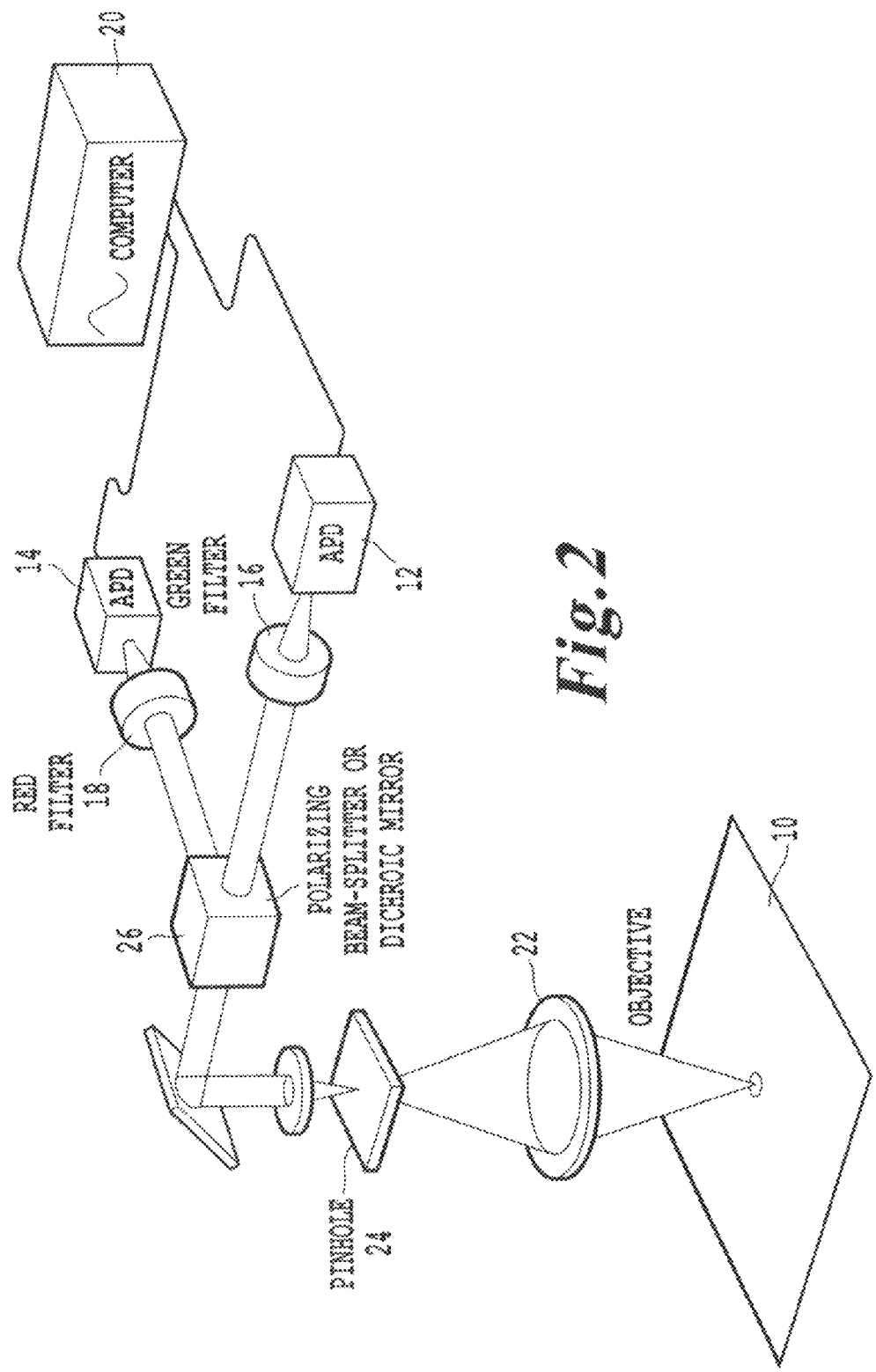
FIG. 2 shows a schematic setup of a confocal microscope device which can be used in the microscope measurement system according to the invention.

The confocal microscope comprises two detectors 12, 14 to detect luminescence intensity ratios. Each of the detectors 12, 14 has an associated interference filter 16, 18 to selectively detect a specific wavelength. The detectors 12, 14 preferably are avalanche photo diodes who pass detection signals to a computer 20 for evaluating the detection results and controlling a scanning stage (not shown in FIG. 2). The confocal microscope further comprises a high numerical non-immersion or immersion-objective lens 22, a notch or edge cut-off filter 24 to cut off the excitation wavelength at the entrance of the detection unit, the detection unit further comprising a dichroic beam splitter 26 and the two detectors 12, 14. The dichroic beam splitter can be formed by a dichroic mirror adjusted to the wavelengths that are to be detected by the two detectors. The light source (not shown) can be a laser, a laser diode or a light emitting diode, without being limited thereto. The computer 22 comprises software to control and collect data from the detectors as well as to control the scanning stage (not shown in FIG. 2).

Figure 3A:
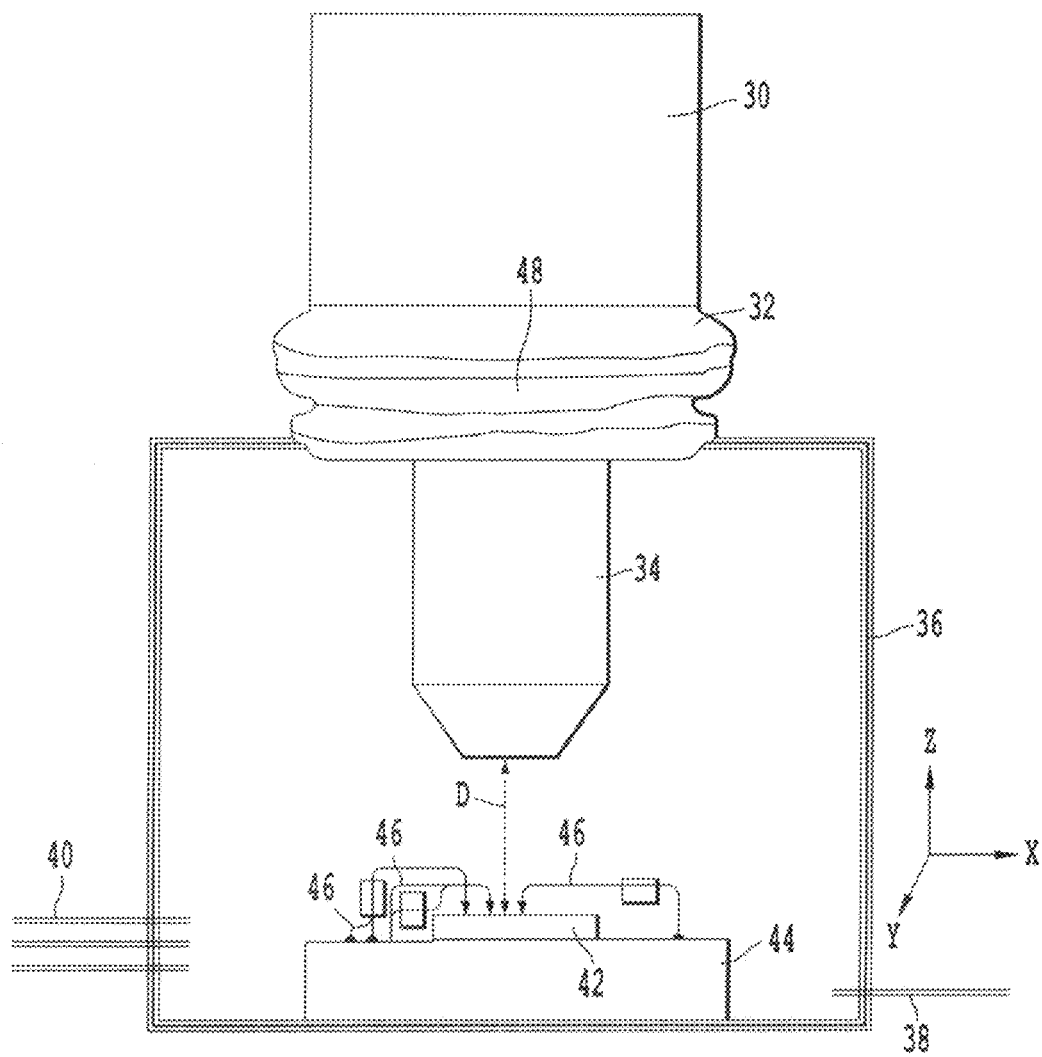
FIG. 3a shows a schematic drawing of the microscope measurement system according to the invention.
Figure 3B:
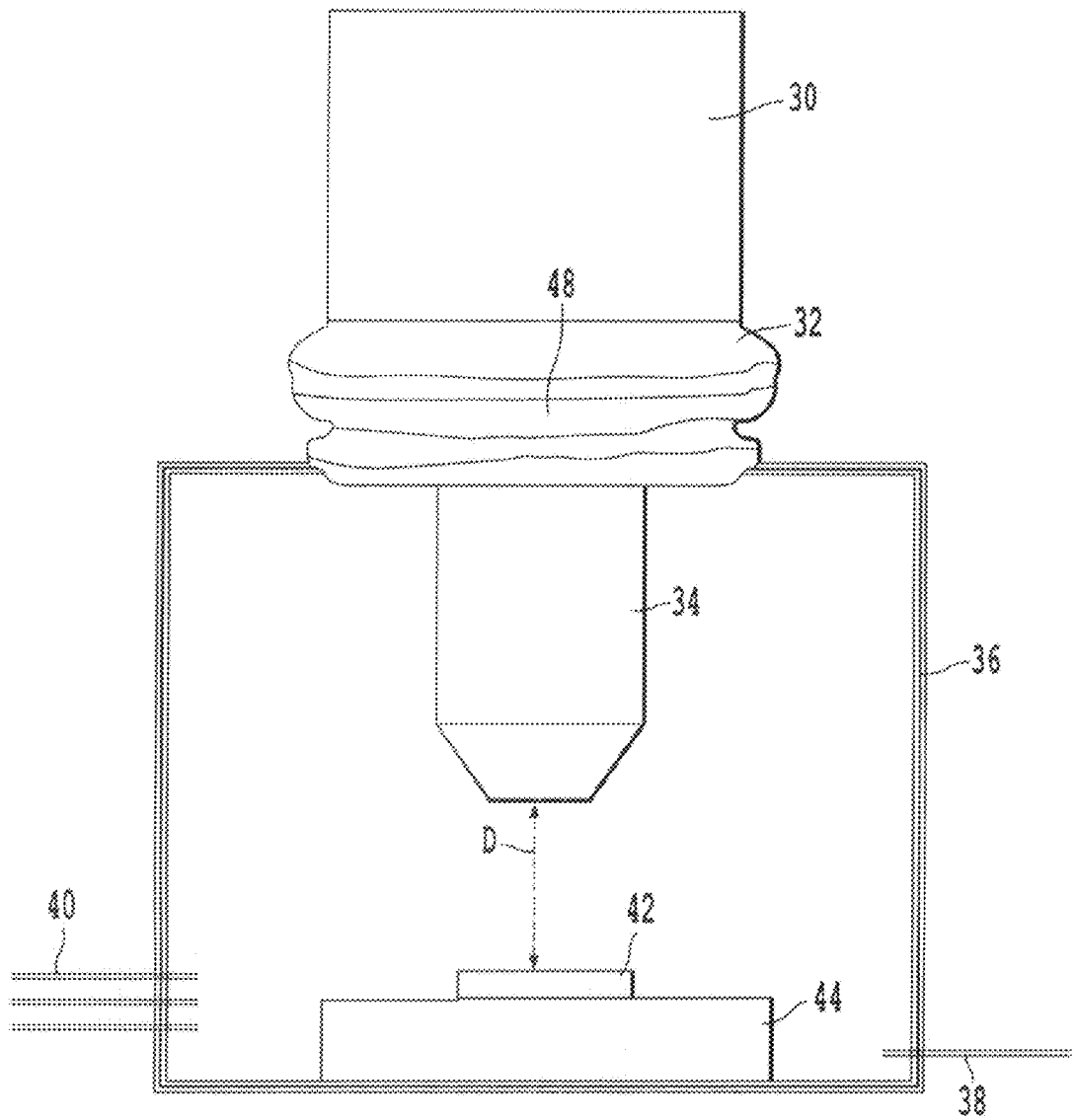
FIG. 3b shows a similar view as FIG. 3a, without electrical probes.

FIG. 3 schematically shows the setup of the microscope measurement system according to the present invention. The system comprises an optical microscope having a microscope body 30 and an objective means comprising a revolver 32 carrying one or more objectives 34 wherein only one of the objectives 34 is shown in FIG. 3. The optical microscope is arranged in such a way that the microscope body 30 is outside of a chamber 36 and the objective 34 is inside of said chamber. The chamber 36 is a sealed chamber which is suitable to maintain an inert atmosphere or vacuum therein. It is also possible to maintain the gas in the chamber at a defined positive pressure and to allow a controlled gas flow from the chamber to escape to the outside but not vice versa. In FIG. 3, there is schematically shown an inert gas inlet 38 for introducing an inert gas, such as nitrogen, into the chamber 36 as well as electrical and/or mechanical chamber connections 40 which can be used to provide electrical signals from/to an object 42 to be examined. Additionally, a gas outlet as well as further connections such as sensor connections and the like can be provided. The object 42 to be examined is located on a x-y-z piezo stage 44 which is adapted to move horizontally in the x and y direction as well as vertically in the z direction. Further, FIG. 3 shows electrical probes 46 which can be connected to the object 42 to be examined, e.g. through the use of nano-manipulators. Additionally, it is possible to locate the chamber on a x-y-table which is operated e.g. manually for effecting coarse adjustment of the position of the object 42.

A sealing means 48 is provided between the optical microscope, more particularly the revolver 32 of the objective and the chamber 36. The sealing means 48 is designed in such a way that it allows the revolver 32 and the objective 34 to rotate relative to the microscope body 30 and additionally allows movement of the objective 34 in the vertical, z, direction and in the horizontal, x and y, directions wherein movements in the x and y directions usually will be in the sub-Millimeter range or a few Millimeters at most.

Accordingly, it is possible to manipulate the object 42 to be examined within the sealed chamber 36 and to bring the objective 34 extremely close to the object 42 while preserving the possibility of rotating the objective 34 as well as adjusting the x-y-position and focal distance of the objective in order to optimize the resolution of the microscope. With this setup, it is possible to provide a x-y resolution down to 200 nm or better and a z resolution of 400 nm or better.

Further, as the measurement is performed in an inert atmosphere, it is possible to measure luminescence of semiconductor devices in operation and from any other samples which need to be maintained in a controlled atmosphere. For example, when examining a transistor in operation, it is possible to obtain simultaneous detection of a luminescence signal from the surface of the device and a luminescence signal due to hot carriers or hot spots inside the gate of the transistor which is about 500 nm below the surface. This will be explained in further detail with respect to FIGS. 8 and 9.

Depending on the type of microscope used, the distance D between the objective 34 and the surface of the object 42 to be examined can be as low as 1 mm or, if a scanning near-field optical microscope is used, even in the order of a few nm, such as 5 nm to 30 nm. In an embodiment where a confocal scanning microscope is used, the distance D will be in the range of about 1 to 5 mm.

Figure 4:
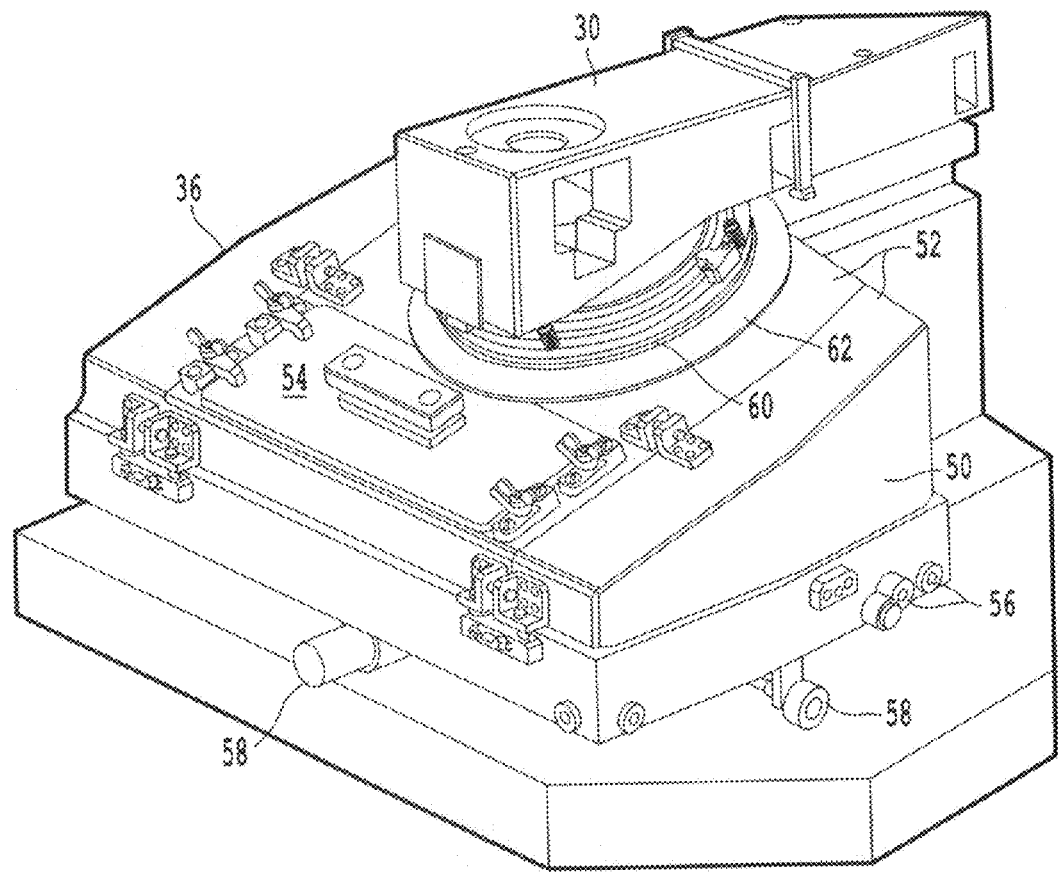
FIG. 4 shows a perspective view of the microscope measurement system according to a preferred embodiment.

FIG. 4 shows a perspective view of the microscope measurement system according to the invention. In FIG. 4, only the microscope body 30 is to be seen, as the objective is hidden inside the chamber 36. The chamber 36 comprises an aluminum bottom part 50, an upper cover part 52 having a lid 54 for inserting and removing an object to be examined therein. The cover part 52 and the bottom part 50 are connected in a gas-tight manner. At the bottom part 50, connectors 56 for introducing inert gas into the chamber 36 as well as connectors for electrical probes and the like are shown. Further, knobs 58 are provided for manipulating an x-y-table on which the chamber is mounted (not shown). A sealing means 60 including a rubber sleeve interconnect 62 is provided between the optical microscope and the chamber 36 in order to ensure that even when changing the objectives by revolver rotation, the sealed atmosphere within the chamber 36 is maintained.

Figure 5:
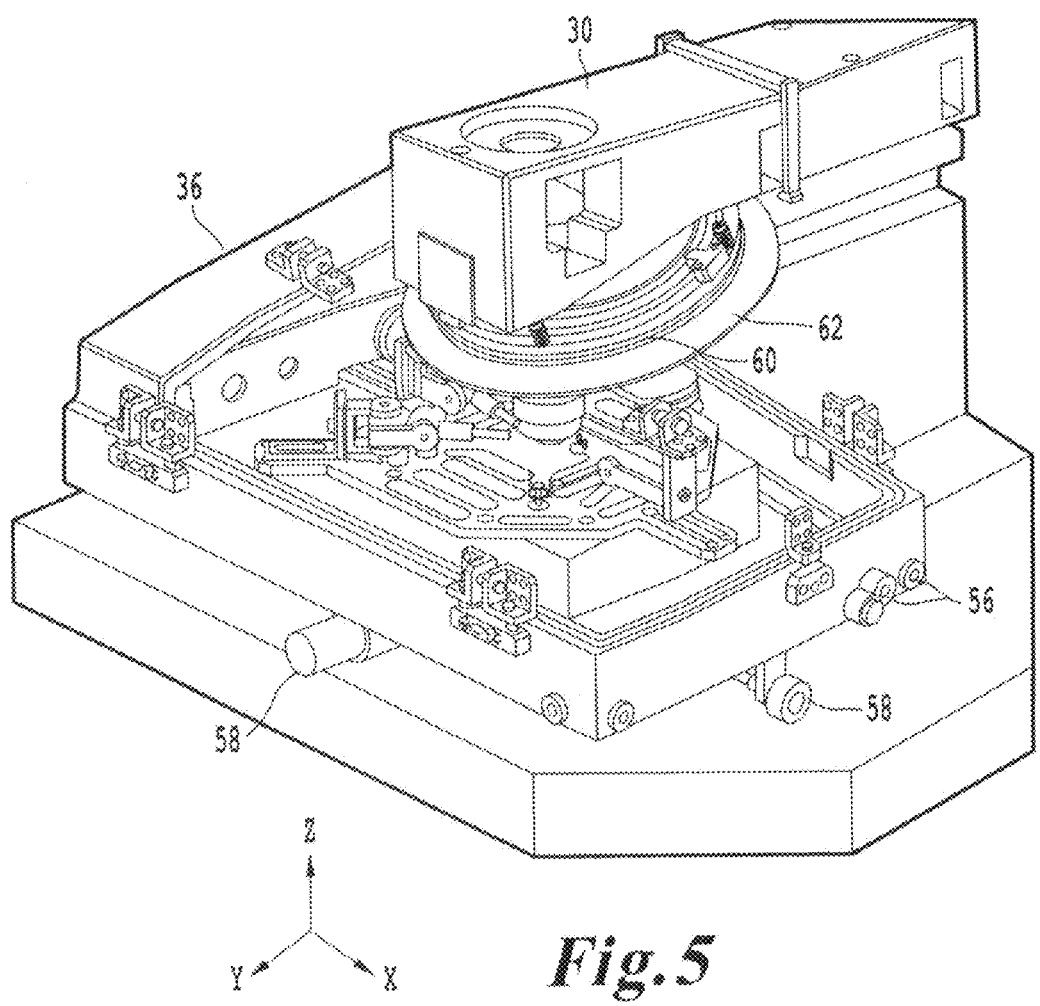
FIG. 5 shows a similar view of the microscope measurement system as in FIG. 4, wherein the cover of the chamber has been removed partly.

FIG. 5 shows further details of the microscope measurement system of FIG. 4, wherein the same reference numbers are used for designating the same components. As shown in FIG. 5, the microscope measurement system comprises a scanning piezo stage 44 which is mounted on a light-weight aluminum holder plate 64 fixed to the bottom 50 of the chamber 36. Three Kleindiek 3D nano-manipulators 66 are also mounted to the holder plate 64. The combination of the light-weight Kleindiek nano-manipulators 66, having a weight of about 45 g and being specially designed for light-weight holder plates, ensures smallest possible impairment of the piezo-driven stage scanning rate. Therefore, it is possible to mount the nano-manipulators 66 close to or even on the piezo stage 44 which allows to save space and use smaller manipulators occupying less space within the chamber 36. The manipulators can be used for electrically contacting electronic devices or they can be used as tweezers or pipettes depending on the type of object under examination and the type of test performed.

Figure 6A:
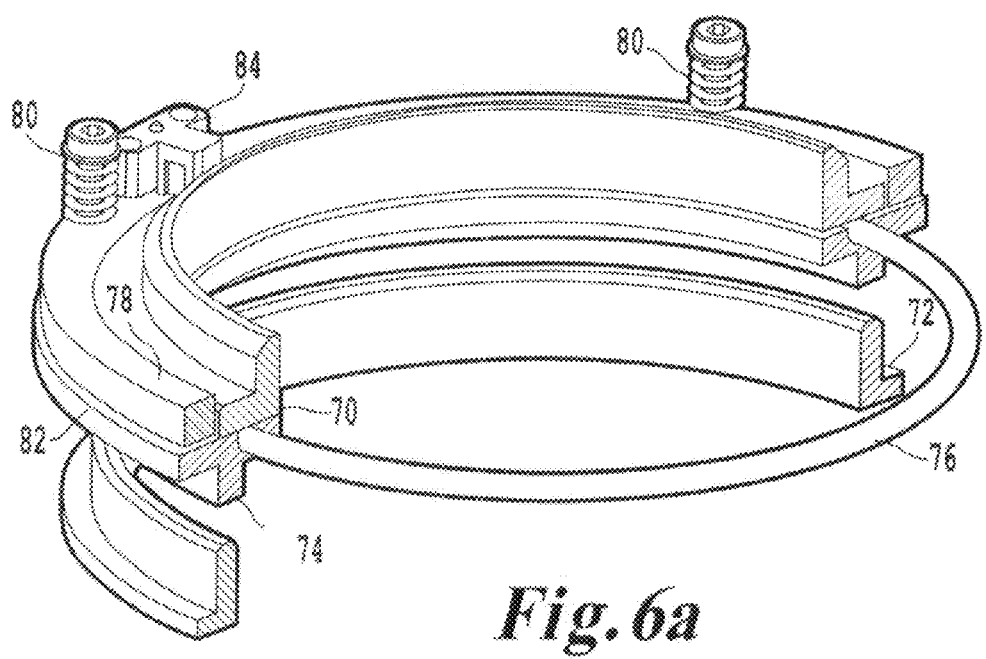
FIGS. 6a and 6b show a partly cut view and a perspective view of a sealing means for providing a gas-tight connection between the optical microscope and the chamber in the microscope measurement system according to the invention.
Figure 6B:
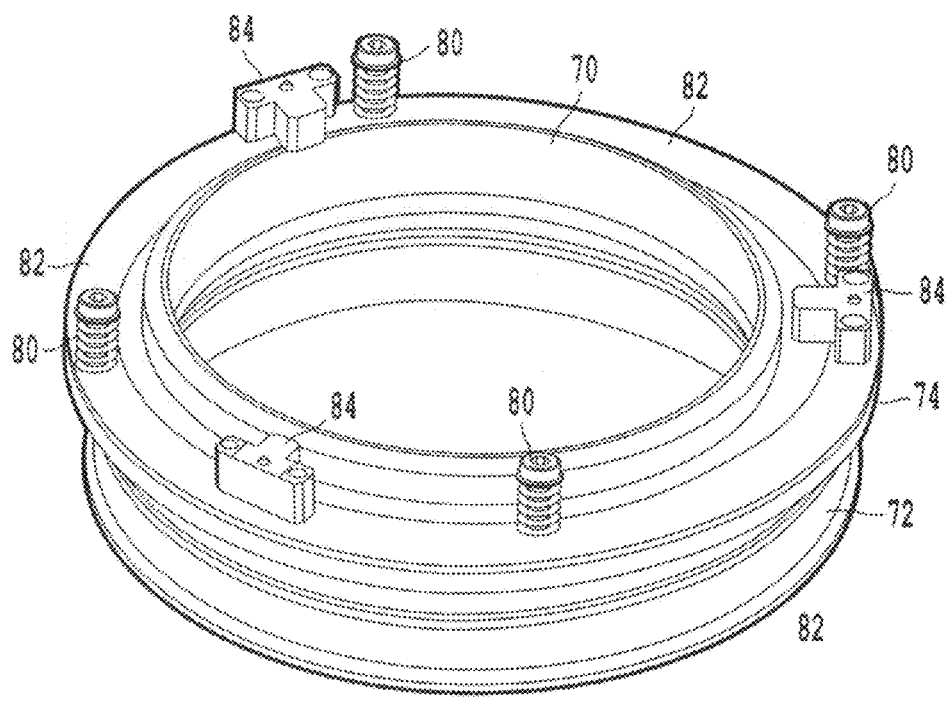

FIGS. 6a and 6b show the design of the sealing means for providing an essentially gas-tight connection between the optical microscope and the chamber. The sealing means is comprised of a system of rings which are connected to the microscope revolver 32 and the inner circumference of an opening provided in the chamber 36. This system of rings ensures rotational freedom of the revolver and allows up and down movement of the objective in the z axis as well as lateral movement in the x and y directions while sealing the chamber 36 which e.g. is filled of nitrogen. An upper or revolver ring 70 is connected and sealed to the revolver 32. A lower or chamber ring 72 is connected and sealed to the chamber. The revolver ring 70 is further connected to an adapter ring 74 in such a way that the revolver ring 70 and the adapter ring 74 can be rotated relative to each other. An O-ring 76 is pressed in-between the revolver ring 70 and the adapter ring 74 via an auxiliary ring 78 using a number of springs 80, such as four springs. The maximum pressure within the chamber 36 can be regulated by changing the spring tension. Accordingly, it is possible to adjust the spring tension such that the chamber is hermetically sealed or that a defined air flow is allowed to escape from the chamber. In the latter case, the interior of the chamber preferably is maintained at a defined positive gas pressure which can be adjusted via the springs 80. To hold the revolver ring 70 and the adapter ring 74 relative to each other, relative to the revolver and to the chamber, a number a bearings are used. In the example of FIGS. 6a and 6b, three horizontal bearings 82 and three vertical bearings 84 are provided. The horizontal bearings 82 keep the setup pivotal, whereas the vertical bearings 84 allow pivoting of the revolver, e.g. for changing objectives, and apply a vertical force on the revolver ring 70 and thus on the O-ring 76 so as to prevent gas-leakage during use. The horizontal bearings 82 apply a horizontal force (in the x-y-directions) on the auxiliary ring 78 and thus on the revolver ring 79 to provide a guiding shoulder for the revolver ring for rotation relative to the adapter ring 74. The vertical bearings 84 apply a vertical force (in the z direction) and restrain vertical movement (z) of the revolver ring 70 relative to the adapter ring 74 so as to hold the two rings 70, 74 in sliding contact with each other.

The revolver ring 70, the chamber ring 72 and the adapter ring 74 are preferably made from a light-weight aluminum whereas the springs could be made of steel, for example.

Figure 7:
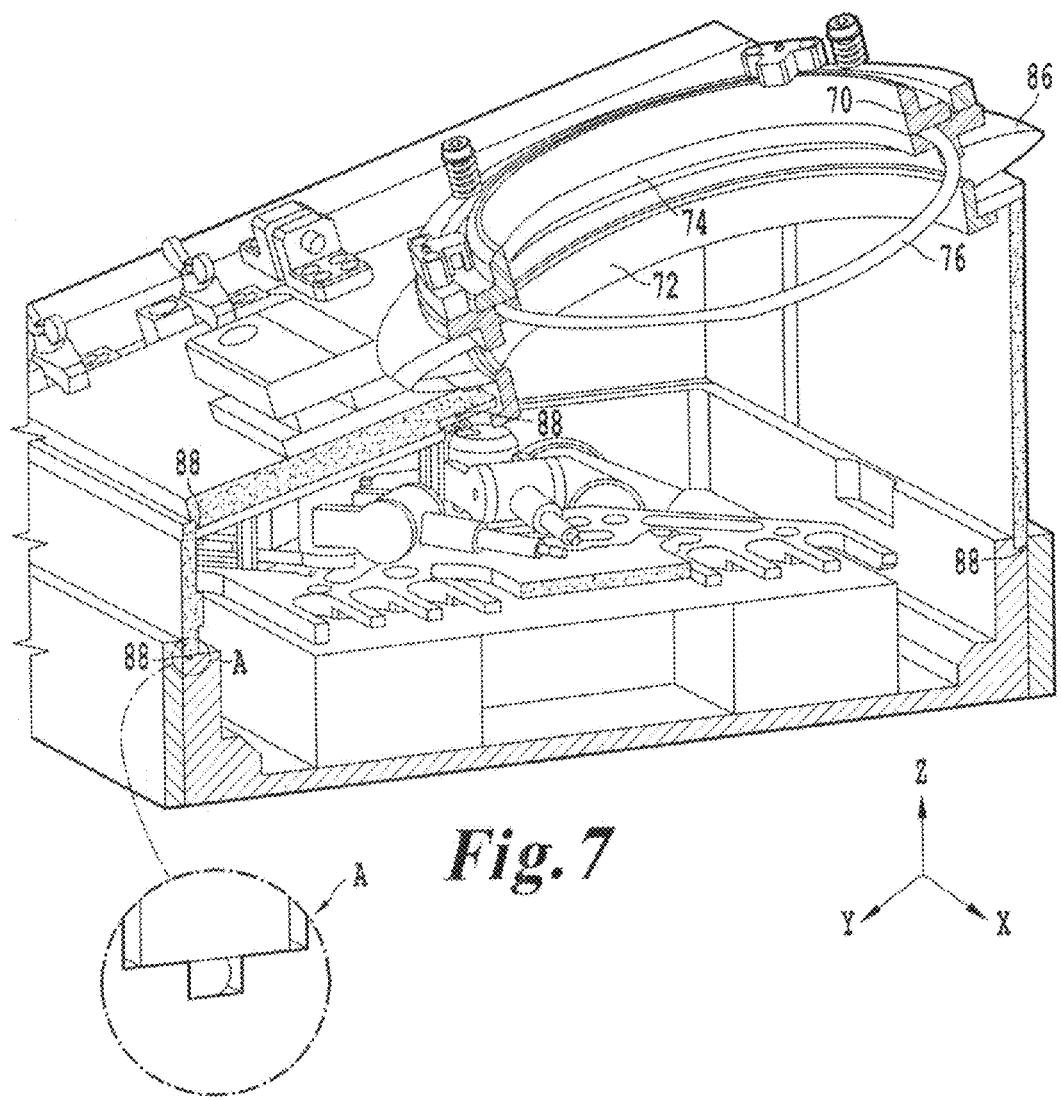
FIG. 7 shows a cut perspective view of the microscope measurement system according to the invention.

The chamber ring 72 and the adapter ring 74 are connected via a sleeve 86 which is shown in FIG. 7. The sleeve 86 is preferably made from rubber, such as butyl-rubber. During operation, the chamber ring 72 will be fixed and the adapter ring 74 will be able to move vertically (z) as well as laterally (x, y) to a certain degree but will not rotate so that no rotational force is applied to the rubber sleeve 86. The revolver 32, however, can rotate freely via the revolver ring 70 without losing the gas-tight connection of the optical microscope in the chamber. Vertical movement of the objectives is necessary and possible for focusing the objectives. Lateral movement can be necessary for adjusting the position of the objective to different types of objects to be examined. As described with respect to FIGS. 6a and 6b, the sealing of the measuring system is provided via the O-ring 76. The static non-rotating parts of the chamber are additionally sealed by rubber cord sealings 88 adjusted statically between the different parts of the chamber 36 using exterior screw sets.

Figure 8:
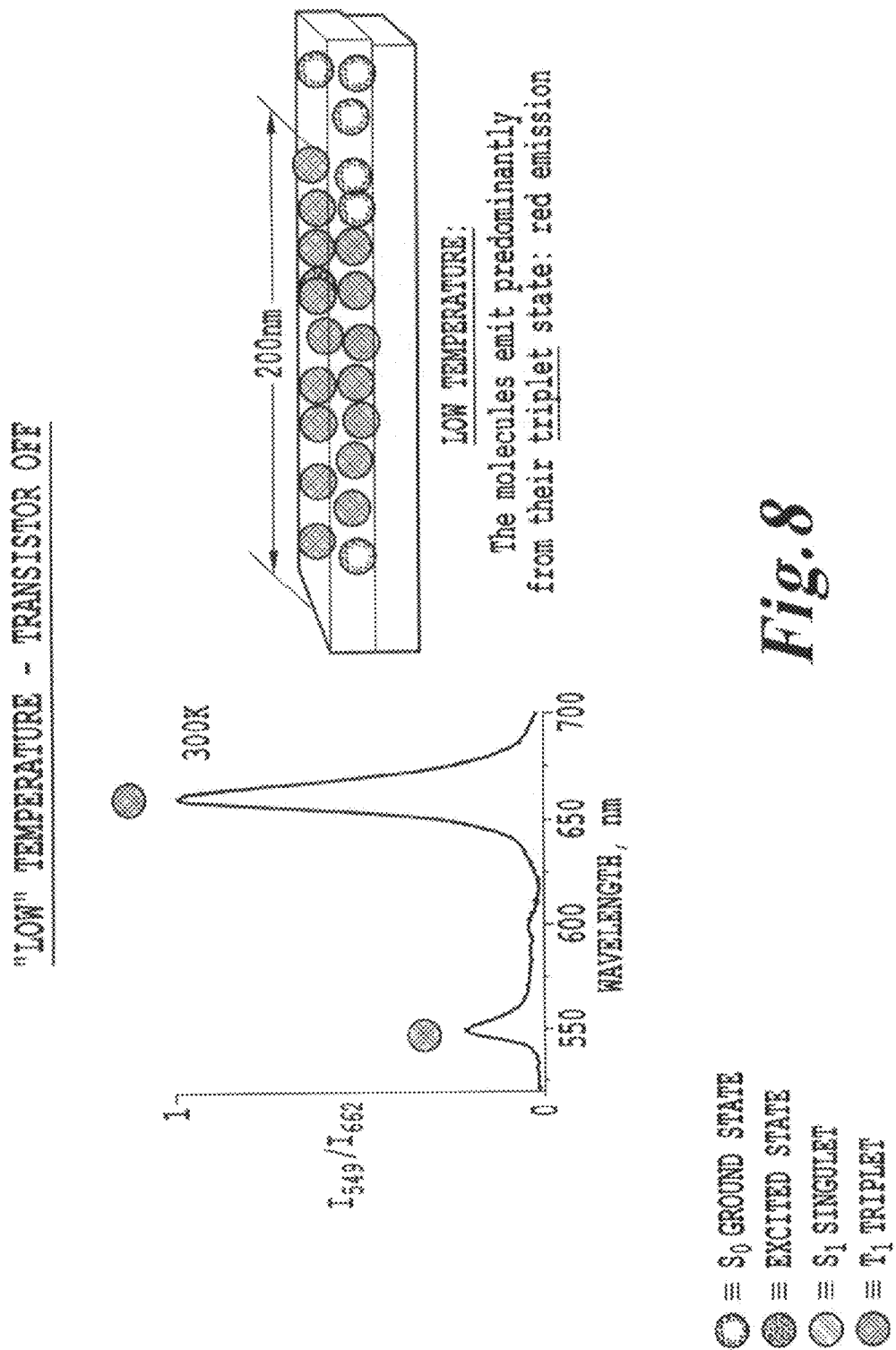
FIGS. 8 and 9 show schematic diagrams for explaining the use of the microscope measurement system according to the invention for detecting luminescence signals from the surface of a transistor during operation of the transistor.
Figure 9:
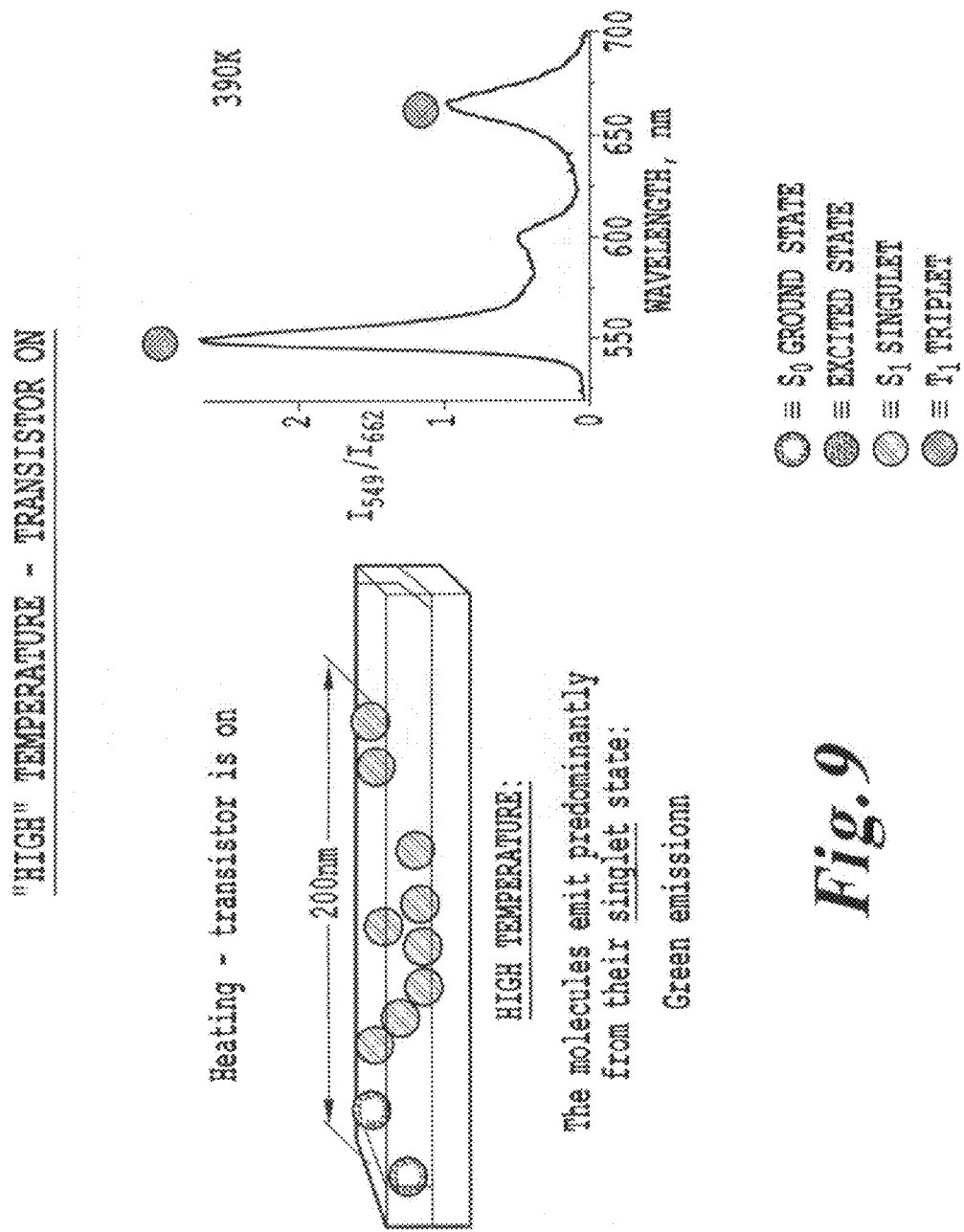

FIGS. 8 and 9 schematically show molecule emission by a transistor onto which a thermometer layer has been applied and emission spectra at different temperatures, wherein FIG. 8 shows the case that the transistor is switched off and FIG. 9 shown the case where the transistor is switched on. During operation, the transistor is generating hot spots or hot carriers in the gate area which can be detected with the microscope measurement system of the invention.

The transistor has been prepared as explained above by applying a thermometer layer and inserting the prepared transistor into the chamber of the microscope measurement system according to the invention. Using a confocal microscope, luminescence emitted from the molecules of the thermometer layer is measured. At low temperatures, when the transistor is off, the molecules emit predominantly from their triplet state which is detected as red emission. When the transistor is turned on, the transistor will produce hot carriers inside the gate, at some 100 nm below the surface, which can be detected as green emission generated by molecules emitting predominantly from their singlet state. Red emission and green emission can be detected simultaneously and, using the two detectors, the luminescence intensity ratio of the fluorescence intensity of a singlet state of the molecular thermometer, optionally including a delayed fluorescence that follows a triplet-triplet annihilation process, at said first wavelength (green emission), to a phosphorescence intensity from an excited triplet state of said molecular thermometer at the second wavelength (red emission) is determined as $I_{singlet}/I_{triplet}$. From this luminescence intensity ratio, heating of the transistor can be examined and located.

Figure 10:
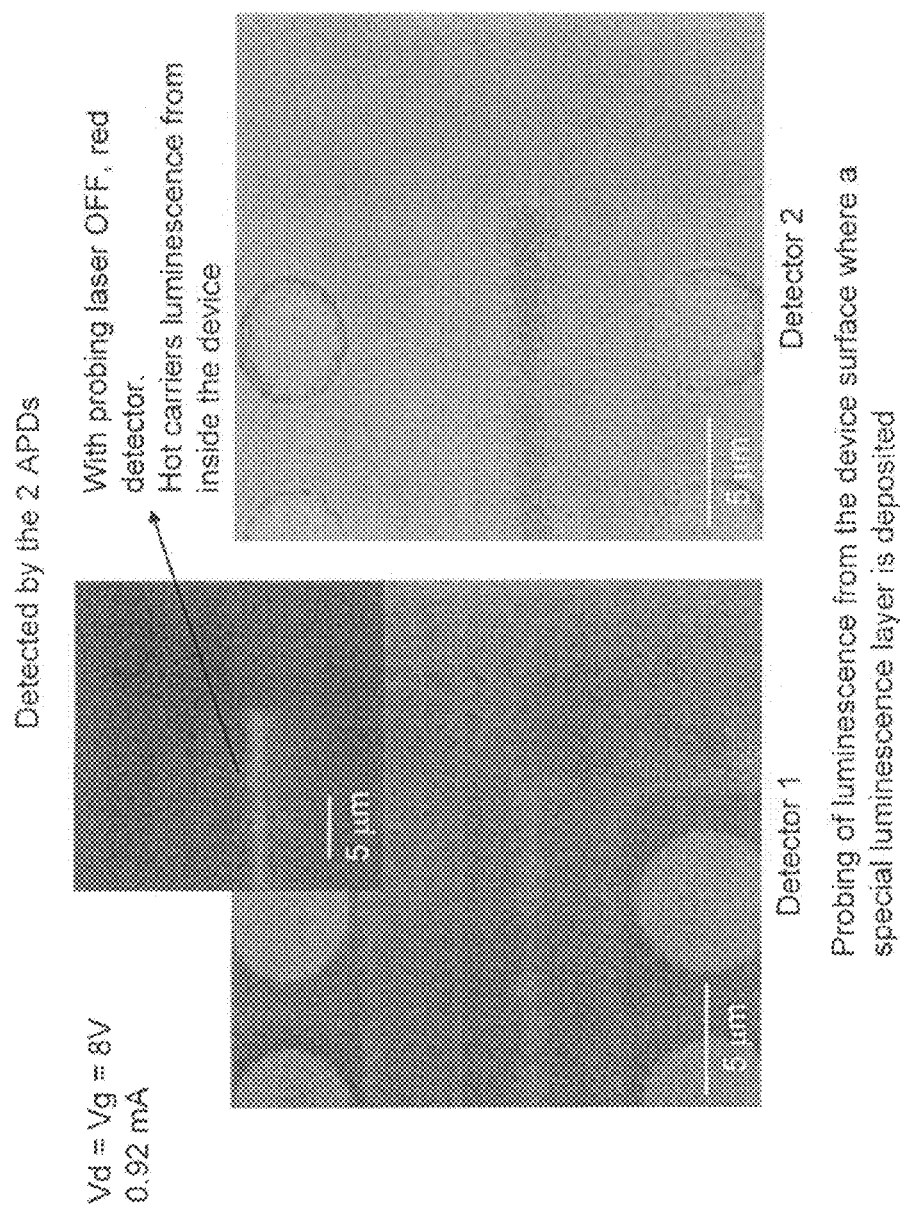
FIG. 10 shows an image which is detected by a confocal microscope examining a transistor which is turned off and a transistor in operation.

FIG. 10 shows images detected by the two detectors (APD) of a confocal microscope wherein Detector 1 is tuned to red emission thus detecting an image of a transistor which is turned off and Detector 2 is tuned to green emission thus detecting an image of a transistor which is turned on, both transistor surfaces being treated with thermometer layers as described above.

Figure 11:
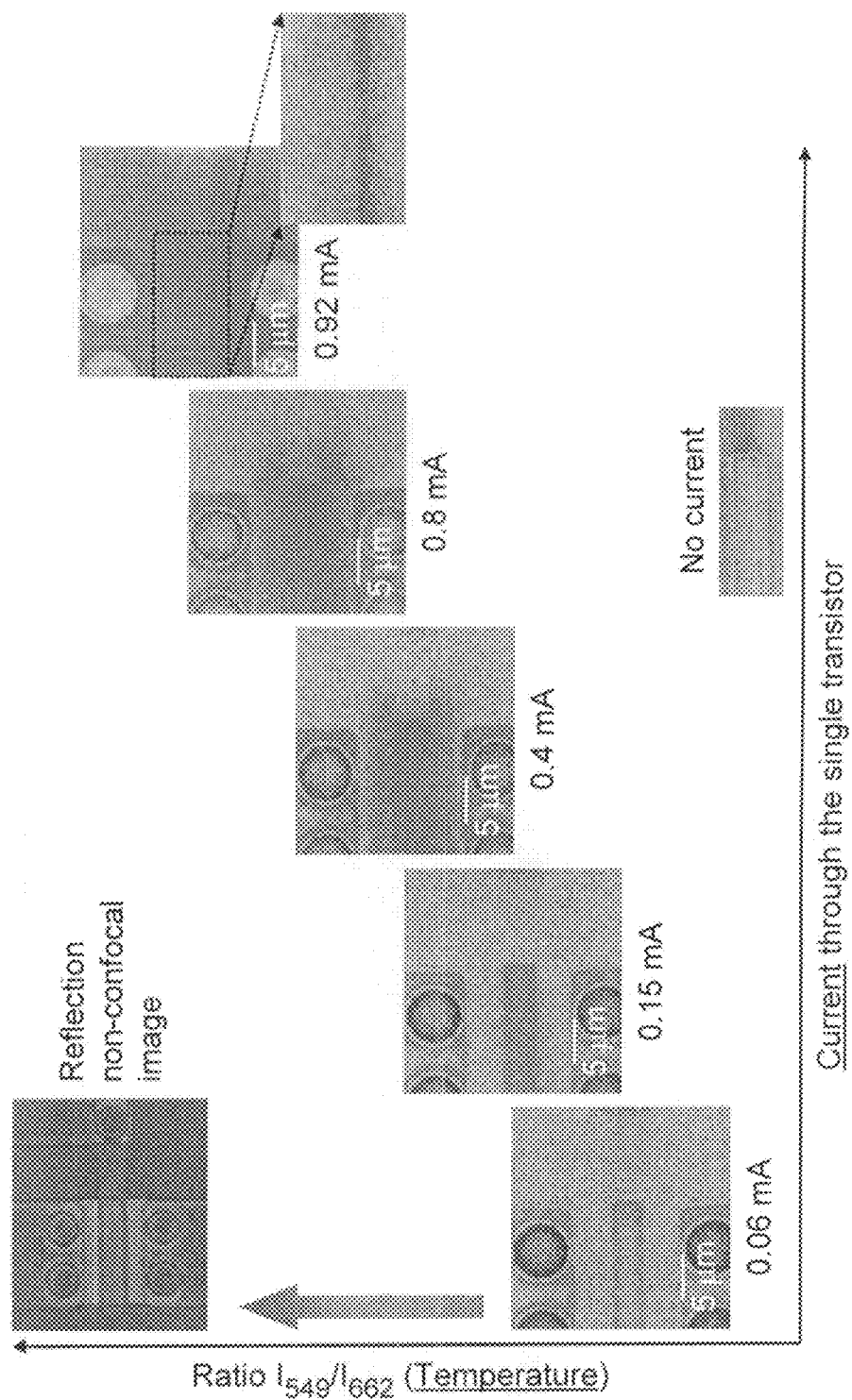
FIG. 11 shows the development of images taken with a confocal microscope while the current through a single transistor is increased.

FIG. 11 shows a diagram of luminescence intensity ratio versus current flowing through a single transistor, the luminescence intensity ratio basically corresponding to the temperature of the transistor. As shown in FIG. 11, the two detectors and the luminance intensity ratio derived there from allow to visualize temperature changes within the transistor depending on current applied to the transistor or on other factors.

For further details regarding heat behavior of a transistor during operation as well as change of transistor behavior due to stress, reference is made to Japanese Journal of Applied Physics, vol. 42 (2003), pages 1168-1172, part I, Nr. 3, March 2003: "Analysis and Classification of Degradation Phenomena in Polycrystalline-Silicon Thin Film Transistors Fabricated by a Low-Temperature Process Using Emission Light Microscopy", S. Inoue et al.

The features of the present invention disclosed in the specification, the claims and/or in the accompanying drawings, may, both separately, and in any combination thereof, be material for realising the invention in various forms thereof.

LIST OF REFERENCE NUMERALS 12, 14 detectors
16, 18 interference filters
20 computer
22 high numerical non-immersion or immersion-objective lens
24 notch or edge cut-off filter
26 dichroic beam splitter
30 microscope body
32 revolver
34 objectives
36 chamber
38 inert gas inlet
40 electrical and/or mechanical chamber connections
42 object to be examined
44 x-y-z piezo stage
46 electrical probes
48 gas-tight sealing means
50 bottom part
52 upper cover part
54 lid
56 connectors
58 knobs
60 sealing means
62 sleeve interconnect
64 light-weight aluminum holder plate
66 Kleindiek 3D nano-manipulators
70 upper or revolver ring
72 lower or chamber ring
74 adapter ring
76 O-ring
78 auxiliary ring
80 springs
82 horizontal bearings
84 vertical bearings
86 sleeve
88 cord seals

The invention claimed is:

1. A sealing means for providing a gas-tight connection between an optical microscope and a chamber in which an object to be examined is located to seal the chamber, the sealing means comprising:
a chamber ring fixedly connectable to a portion of the chamber which forms an opening of the chamber;
an objective ring fixedly connectable to an objective of the optical microscope;
an adapter ring mounted to the objective ring to allow rotation of the objective ring relative to the adapter ring and the chamber ring; and
a flexible sleeve mounted to both the chamber ring and the adapter ring to create a seal between the chamber ring and the adapter ring,
wherein the chamber ring, the objective ring, and the adapter ring are made of a same material, and
wherein the adapter ring is connected to the chamber ring and the objective ring so as to be movable vertically and laterally but not to rotate.

2. A sealing means according to claim 1, wherein the flexible sleeve is configured to allow relative movement between the chamber ring and the adapter ring along a longitudinal axis of an objective providing means for providing at least one objective, including the objective, as well as lateral movement of the objective providing means, the objective providing means including the at least one objective, and the at least one objective being movable along the longitudinal axis of the objective providing means as well as laterally thereto.

3. A sealing means according to claim 1, further comprising a seal ring provided between the objective ring and the adapter ring.

4. An optical microscope comprising:
a microscope body;
an objective providing means for providing at least one objective connected to the microscope body, the objective providing means including the at least one objective, and the at least one objective being movable along a longitudinal axis of the object providing means as well as laterally thereto; and
sealing means mounted on the objective providing means for providing an essentially gas-tight connection between the optical microscope and an opening in which the objective providing means is to be inserted,
wherein the sealing means includes a mounting ring connectable to a portion of a chamber which forms the opening in which the objective providing means is to be inserted, an objective ring fixedly connected to and sealed with the objective providing means, an adapter ring mounted to the objective ring to allow rotation of the objective ring relative to the adapter ring and the chamber ring, and a flexible sleeve mounted to both the mounting ring and the adapter ring to create a seal between the mounting ring and the adapter ring,
wherein the chamber ring, the objective ring, and the adapter ring are made of a same material, and
wherein the adapter ring is connected to the chamber ring and the objective ring so as to be movable vertically and laterally but not to rotate.

5. An optical microscope according to claim 4, wherein the flexible sleeve is configured to allow relative movement between the mounting ring and the adapter ring along the longitudinal axis of the objective providing means as well as lateral movement of the objective providing means.

6. A chamber for holding an object to be examined by an optical microscope, the chamber comprising:
support means for holding the object to be examined therein;
an opening configured for insertion of an objective of the microscope into the chamber such that the objective is located essentially within the chamber at a predetermined distance from the object to be examined; and
sealing means providing an essentially gas-tight connection between the optical microscope and the chamber such that the chamber is sealed,
wherein the sealing means includes a chamber ring fixedly connected to and sealed with a portion of the chamber which forms the opening, an objective ring fixedly connected to and sealed with a portion of the objective, an adapter ring mounted to the objective ring to allow rotation of the objective ring relative to the adapter ring and the chamber ring, and a flexible sleeve mounted to both the chamber ring and the adapter ring to create a seal between the chamber ring and the adapter ring,
wherein the chamber ring, the objective ring, and the adapter ring are made of a same material, and wherein the adapter ring is connected to the chamber ring and the objective ring so as to be movable vertically and laterally but not to rotate.

7. The chamber according to claim 6, wherein the support means includes a scanning piezo stage configured to move the object supported thereon in x-, y- and z-directions.

8. The chamber according to claim 7, wherein the support means includes an object holder mounted on the scanning piezo stage and at least one nano-manipulator.

9. The chamber according to claim 6, further comprising a gas inlet configured to introduce an inert gas into the chamber.

10. A microscope measurement system comprising:
an optical microscope including a microscope body and an objective providing means for providing at least one objective, the objective providing means being connected to the microscope body, and the at least one objective being movable along a longitudinal axis of the objective providing means as well as laterally thereto;
a chamber including support means for holding an object to be examined therein, the chamber including an opening for insertion of the objective providing means into the chamber such that the objective providing means is located essentially within the chamber and the microscope body is located essentially outside of the chamber; and
sealing means for providing an essentially gas-tight connection between the optical microscope and the chamber such that the chamber is sealed,
wherein the sealing means includes a chamber ring fixedly connected to and sealed with a portion of the chamber which forms the opening of the chamber, an objective ring fixedly connected to and sealed with the objective providing means, an adapter ring mounted to the objective ring to allow rotation of the objective ring relative to the adapter ring and the chamber ring, and a flexible sleeve mounted to the chamber ring and the adapter ring to create a seal between the chamber ring and the adapter ring,
wherein the chamber ring, the objective ring, and the adapter ring are made of a same material, and
wherein the adapter ring is connected to the chamber ring and the objective ring so as to be movable vertically and laterally but not to rotate.

11. A system according to claim 10, wherein the objective providing means is configured to rotate relative to the microscope body, and the sealing means is configured to allow rotation of the objective providing means relative to the microscope body.

12. A system according to claim 10, wherein the objective providing means includes a revolver body carrying the at least one objective.

13. A system according to claim 12, wherein the objective providing means is arranged in the chamber such that a distance between one of the at least one objective and the object to be examined is less than 6 mm, between 1 nm and 5 mm, in a range of 5-30 nm, or on an order of about 1 mm.

14. A system according to claim 10, wherein the chamber includes a gas inlet configured to introduce an inert gas into the chamber.

15. A system according to claim 10, wherein the chamber is mounted on an x-y-table for movement in two orthogonal horizontal directions.

16. A system according to claim 10, wherein the support means includes a scanning piezo stage configured to move the object supported thereon in x- and y-directions.

17. A system according to claim 16, wherein the scanning piezo stage is configured to move the object supported thereon in a z-direction.

18. A system according to claim 16, wherein the support means includes an object holder mounted on the scanning piezo stage and at least one nano-manipulator.

19. A system according to claim 10, wherein the sealing means is configured to allow movement of the objective providing means along the longitudinal axis of the objective providing means as well as lateral movement of the objective providing means.

20. A system according to claim 10, wherein the flexible sleeve is configured to allow relative movement between the chamber ring and the adapter ring along the longitudinal axis of the objective providing means as well as lateral movement of the objective providing means.

21. A system according to claim 10, further comprising a seal ring provided between the objective ring and the adapter ring.

22. A system according to claim 10, wherein the sealing means further includes an auxiliary ring to mount the adapter ring to the objective ring.

23. A system according to claim 22, wherein the auxiliary ring includes spring means for adjusting a contact pressure between the objective ring and the adapter ring to adjust an internal gas pressure of the chamber.

24. A system according to claim 10, wherein the optical microscope is a confocal luminescence microscope, a stimulated emission depleted (STED) microscope, or a scanning near field optical microscope (SNOM).

* * * * *